United States Patent [19]

Wagensonner et al.

[11] 3,958,256

[45] May 18, 1976

[54] PHOTOGRAPHIC CAMERA

[75] Inventors: Eduard Wagensonner; Kurt Borowski, both of Aschheim, Germany

[73] Assignee: AGFA-Gevaert, A.G., Leverkusen, Germany

[22] Filed: Oct. 24, 1974

[21] Appl. No.: 517,842

[30] Foreign Application Priority Data
Oct. 27, 1973 Germany............................ 2353924

[52] U.S. Cl................................ 354/44; 354/23 D; 354/38; 354/43; 354/51; 354/60 A; 354/60 L
[51] Int. Cl.²........................................... G03B 7/08
[58] Field of Search .................. 354/43, 44, 38, 29, 354/60 L, 51, 23 D, 60 A

[56] References Cited
UNITED STATES PATENTS

| | | | |
|---|---|---|---|
| 3,455,219 | 7/1969 | Burgarella............................ | 354/43 |
| 3,782,254 | 1/1974 | Matsuzaki et al................. | 354/23 D |
| 3,792,648 | 2/1974 | Ishiguro............................ | 354/23 D |
| 3,798,663 | 3/1974 | Wagensonner et al............. | 354/60 L |
| 3,833,913 | 9/1974 | Wick et al. ............................ | 354/51 |

OTHER PUBLICATIONS
Pin-Out Diagram for 7477 Quad Bistable Latch, from TTL Pinout Handbook, IMS Associates, Inc.

Primary Examiner—L. T. Hix
Assistant Examiner—Russell E. Adams, Jr.
Attorney, Agent, or Firm—Michael J. Striker

[57] ABSTRACT

A single light-sensitive element serves to furnish a signal for setting the aperture prior to the exposure time and to control the exposure time. Prior to the exposure time a first and second threshold stage furnish a first and second threshold output signal respectively when the light is in a first and second predetermined range. The first and second threshold output signals are applied to the control input of a first and second D flip-flop. The output of the D flip-flop varies as a function of the signal at the control input only in the presence of a gating signal. The gating signals are applied to the D flip-flops only prior to the exposure time. The outputs of the first and second D flip-flops are applied to an exclusive OR-circuit whose output is applied to aperture control means which vary the size of the aperture in dependence on the logic circuit output signal. The D flip-flop maintains its output after removal of the gating signal thereby maintaining the aperture size during exposure. A switch operative with the diaphragm aperture control switches integrating circuit elements corresponding to the aperture size into the automatic exposure control circuit of the camera during exposure.

14 Claims, 3 Drawing Figures

PHOTOGRAPHIC CAMERA

BACKGROUND OF THE INVENTION

The present invention relates to a photographic camera having a light-measuring circuit including a light-sensitive element and diaphragm control means which automatically adjust the size of the aperture in correspondence to the signal furnished by the light-measuring circuit. Further, in cameras of this type, an automatic exposure-control circuit is activated during exposure in order to terminate the exposure when a sufficient quantity of light is formed on the film. In general the automatic exposure-control circuits include integrator means such as a capacitor which integrates the signal from the light-sensitive means and furnishes a terminating signal when this so-integrated signal has a predetermined amplitude.

SUMMARY OF THE INVENTION

It is an object of the present invention to furnish a photographic camera of the above-described type but with a programmable arrangement for controlling the automatic exposure-control circuit and the aperture. The automatic program controlled equipment is to operate by use of only a single light-sensitive element.

Further, the programmable arrangement in accordance with the present invention should be implementable in integrated circuits. It should be noted that when a single light-sensitive element is to be used both for the exposure time control and for setting the aperture, the signal furnished by this element must be available not only prior to the taking of the picture during which time the aperture is set, but also while the exposure is being carried out.

The present invention resides in a photographic camera having film, a shutter, a light-sensitive means responsive to the light available for an exposure for furnishing a light-dependent signal corresponding thereto and a diaphragm having an adjustable aperture. It comprises first and second threshold means for furnishing, respectively, a first and second threshold output signal when the light-dependent signal corresponds to light within a first and second light range respectively. Further furnished are first and second bistable means connected, respectively, to said first and second threshold means. Each of the bistable means have a gating input. The output of each of the bistable means varies a function of a signal at a control input only when a gating signal is present at the gating input. In the absence of a signal at the gating input the last state of the bistable means is stored until receipt of the next gating input. In a preferred embodiment of the present invention the gating signal is applied to the gating input prior to the exposure time and is removed at the start of the exposure time. The output of the first and second bistable means are applied to the input of logic means which furnish a logic output signal in response to predetermined combinations of signals at the input. Diaphragm control means adjust the aperture of the diaphragm to a predetermined value in response to said logic output signal and to a second predetermined aperture value in the absence of said logic output signal.

Since the threshold means, in a preferred embodiment of the present invention, are set to different threshold values the system in a preferred embodiment of the present invention, is arranged in such a way that in a first light range both of the threshold stages are conductive, in a second light range the first threshold stage is blocked while the second threshold stage is conductive, and in a third range, the first and second threshold stages are both blocked. Prior to the actual exposure time, the light-sensitive element is directly connected to a resistor and the so-resultant voltage divider furnishes a signal to the threshold stages which are controlled as mentioned above. The resultant threshold outputs are then stored, each in the associated bistable means. During the exposure time the resistor in the light-measuring circuit is replaced by a capacitor and thereby eliminating the light-dependent signal as inputs from the threshold means. Simultaneously, the gating signals are removed from the bistable means therefore causing the signal stored in these bistable means to control the diaphragm during the exposure. When two threshold circuits are used and two associated bistable means, the outputs of the bistable means can be combined to furnish the following simultaneous signal conditions: 0/0, 1/0 and 1/1. These three signal pairs may be used to control an exclusive OR-circuit (one embodiment of logic means) in such a manner that the logic means furnish respective outputs of 0, 1, 0 respectively. Thus the diaphragm control means which are electromagnetic in type, can be deenergized in a first light range, energized in a second light range and again deenergized in a third light range. Thus the possibility exists that for example in the first light range an intermediate size aperture is set, in the second light range a large aperture is set, and in the third light range the intermediate aperture size. Of course if a larger amount of threshold stages, storage means and logic means are used, the diaphragm control system can have more than one armature position or the system may have more than one armature so that more than two distinct aperture values can result.

In a further preferred embodiment of the present invention the threshold means are operational amplifiers whose inverting input receives a reference signal derived from a voltage divider. For the first voltage divider the resistance ratio is set to correspond to a low intensity of illumination while the second voltage divider is set to furnish, for the inverting input of the second threshold means, an intermediate illumination value. In each case the direct input of the operational amplifier is connected to a voltage divider comprising the light-sensitive element and a resistor.

In a further preferred embodiment of the present invention the gating signal for both of the bistable means (which are D flip-flops) are derived from a voltage divider which is disconnected from the source of electrical energy at the beginning of the exposure time. As mentioned above, as long as the gating signal is applied to the bistable means, any changes in illumination falling on the light-sensitive element will be reflected in the outputs of the bistable means. After the above-mentioned voltage divider is disconnected, the last set signal remains at the outputs of the D flip-flops.

In a further preferred embodiment of the present invention the alternate connection of a capacitor and a resistor to the light-sensitive element is accomplished by means of switching transistors the first of which has an emitter-collector circuit connected in parallel with the capacitor and the second having an emitter-collector circuit connected in parallel with the resistor. Prior to the exposure time the capacitor is short-circuited by the switching transistor connected in parallel with it, while during the exposure time the resistor is so short-circuited while the switching transistor connected in parallel with the capacitor is blocked. The use of switching transistors has the advantage that mechanical contacts are avoided and that these transistors are available in integrated circuit form.

In a further preferred embodiment of the present invention an indicator arrangement is connected to the output of the D flip-flop which is connected with the threshold means having a threshold corresponding to the lower light range. The indicator arrangement is activated even while the exposure is being carried out. This is particular advantageous when long exposure times are involved. Further, the photographer can test, by covering the light-sensitive element, whether the battery voltage is sufficient.

In a preferred embodiment of the present invention the indicator means comprise two light-emitting diodes one green, one red and a first transistor connected in parallel with the green and a second transistor connected in parallel with the red light-emitting diode. The base of the first transistor is directly connected to the output of the bistable means while that of the second transistor is connected thereto through an inverter. Thus either one or the other of the transistors are short-circuited depending upon the bistable output signal of this bistable stage.

In a further preferred embodiment of the present invention the control system which controls the diaphragm opening also controls a switch which controls the integrator element is inserted in the automatic exposure-control circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
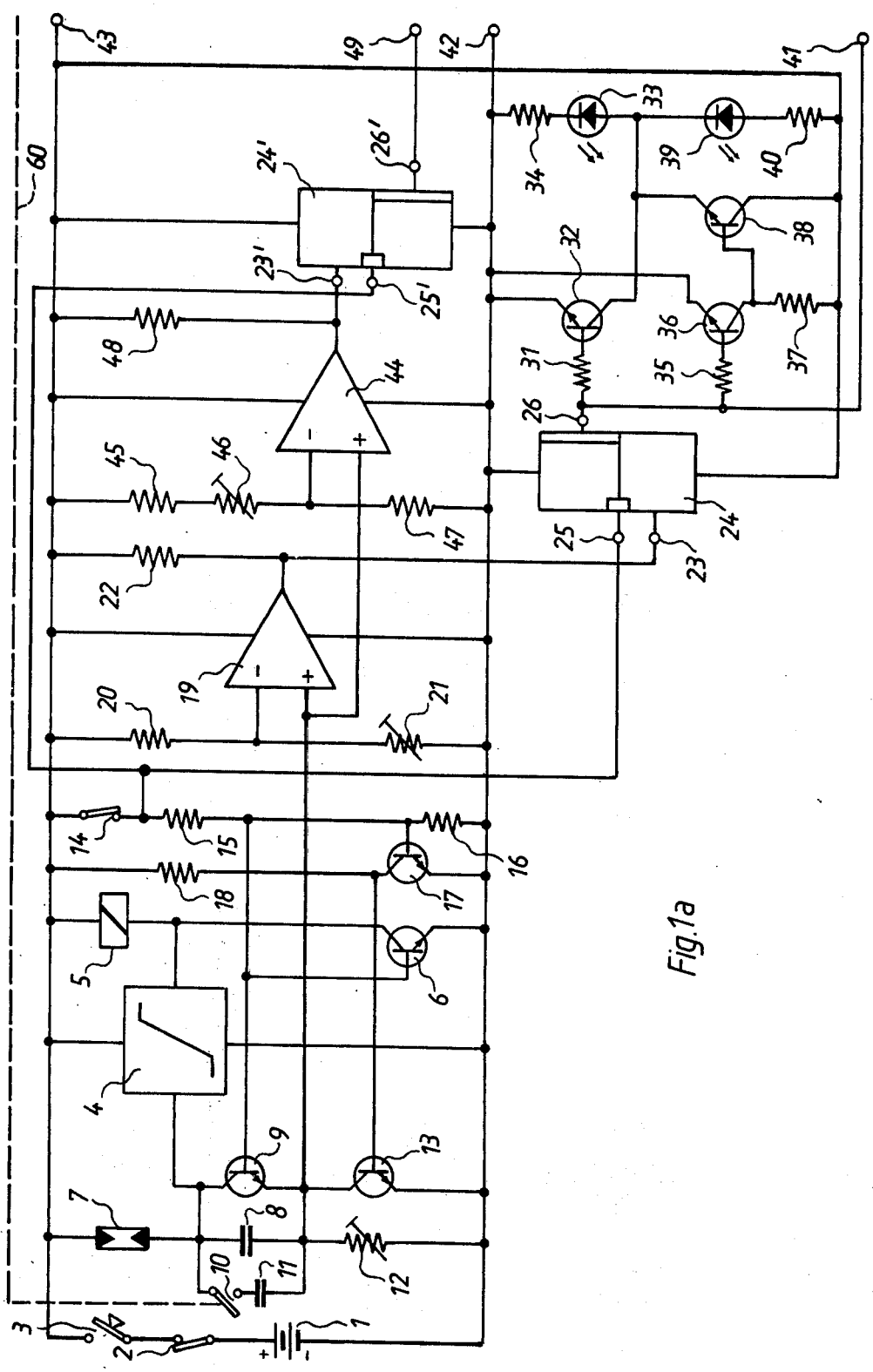
FIGS. 1a and 1b are a circuit diagram of the present invention.

A preferred embodiment of the present invention will now be described with reference to the drawing.

In FIG. 1a reference numeral 1 denotes a source of electrical energy namely a battery. Reference numeral 2 refers to a contact which is closed until the end of the exposure-control process while reference numeral 3 denotes a starting contact which connects battery 1 with the remainder of the circuit. A threshold stage, preferably a bistable threshold stage 4 has a shutter control solenoid 5 in its output circuit which is also connected to the collector of a transistor 6. The input of stage 4 is connected with a voltage divider comprising a photoresistor 7, one embodiment of light-sensitive means, and an integrator capacitor 8, a transistor 9 having an emitter-collector circuit connected in parallel with capacitor 8, a capacitor 11 which may be connected in parallel with capacitor 8 by means of a switch 10, an adjustable resistor 12 connected in series with capacitor 8, and a transistor 13 having an emitter-collector circuit connected in parallel with resistor 12. A normally closed switch 14 connects a voltage divider consisting of a resistor 15 connected in series with a resistor 16 in parallel with battery 1. The voltage divider tap between resistors 15 and 16 is connected to the base of transistor 9. With switch 14 in its normally closed position, the voltage applied to the base of transistor 9 is such that this transistor is fully conductive. Further, the voltage divider tap is also connected to the base of transistor 17 which serves as an inverter and whose collector is connected to the base of transistor 14. A resistance 18 is connected to the collector of transistor 17. Further, the tap between resistors 15 and 16 is also connected to the base of transistor 6.

One side of resistor 12 is connected to the direct input of operational amplifier 19 (one embodiment of first threshold means). The inverting input of operational amplifier 19 is connected to the tap of a voltage divider including resistors 20 and 21. The output resistor of operational amplifier 19 is denoted by reference numeral 22. Resistors 20 and 21 are so proportioned that operational amplifier 19 is blocked when the light falling on light-sensitive resistor 7 is above a lower light intensity limit and is fully conductive when this lower light intensity limit is passed.

Figure 2:
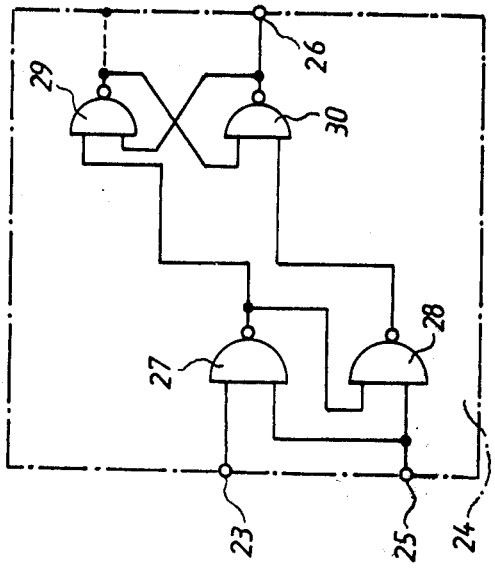
FIG. 2 is a schematic diagram of a D flip-flop.

The output of operational amplifier 19 is connected to the control input 23 of first bistable means namely a D flip-flop 24. A detailed diagram of the D flip-flop 24 is shown in FIG. 2. The side of switch 14 not permanently connected to battery 1 is connected to the gating input 25 of D flip-flop 24. The inverting output of flip-flop 24 is denoted by reference numeral 26.

Before finishing the description of the overall circuit constituting the present invention, the construction of the D flip-flops used herein, namely flip-flops 24 and 24' will be described in detail with reference to FIG. 2. As shown in FIG. 2, D flip-flop 24 comprises NAND-gates 27, 28, 29 and 30. Control input 23 is connected to the first input of NAND-gate 27 whose second input is connected to the gating input 25. The output of NAND-gate 27 is connected to one input of NAND-gate 28 whose second input is connected to the gating input 25. The output of NAND-gate 27 is further connected to the first input of NAND-gate 29. The output of NAND-gate 28 is connected to the second input of NAND-gate 30 whose first input is connected to the output of NAND-gate 29. The second input of NAND-gate 29 is connected to the output of NAND-gate 30. The output of NAND-gate 30 constitutes the inverting output of the D flip-flop and is denoted by reference numeral 26.

The operation of the D flip-flop pictured in FIG. 2 will now be described. First let it be assumed that a "1" potential is present at gating input 25. The control signal at input 23 is assumed to be a "0". This causes a "1" and a "0" output to appear at the outputs of NAND-gates 27 and 28, respectively. The outputs of NAND-gates 29 and 30 in turn assume the "0" and the "1" state respectively. It will be noted that the signal at output 26 is the inverse of the signal applied at control input 23 in the presence of a gating signal at input 25. Now let it be assumed that the signal at control input 23 changes to a "1". This causes a "0" output at NAND-gate 27, a "1" output at NAND-gate 28 and a "1" and "0" output at NAND-gates 29 and 30 respectively. Again, the signal at output 26 is the inverse of the signal at control input 23. If now the signal at gating input 25 is decreased to zero, no change occurs at output 26. A similar decrease at control input 23 following the decrease at gating input 25 again causes no change at output 26. Thus the potential (bistable output signal) at output 26 remains stored until such time as a gating signal is again applied at input 25.

Returning now to the overall circuit, as shown in FIG. 1a, output 26 of D flip-flop 24 is connected through a resistor 31 to the base of a transistor 32 whose emitter-collector circuit is connected in parallel with a series circuit comprising a light-emitting diode 33 and a resistor 34. Light-emitting diode 33 serves to indicate a sufficient light for an exposure and has a green color. Further, output 26 of D flip-flop 24 is connected through a resistor 35 to the base of a transistor 36 whose emitter, together with the emitter of transistor 32 is connected to the negative side of battery 1. A resistor 37 is arranged in the collector circuit of transistor 36. The collector of transistor 36 is connected to the base of a transistor 38 whose emitter-collector circuit is connected in parallel to a series circuit comprising a light-emitting diode 39 and a resistor 40. Light-emitting diode 39 indicates insufficient light conditions and is characterized by the color "red". Further, output 26 is connected to a terminal 41, the negative side of battery 1 is connected to a terminal 42 and the positive side of the battery is connected to a terminal 43.

The common point of resistor 12 and capacitors 8 and 11 is connected to the direct input of an operational amplifier 44 whose inverting input is connected to the tap of a voltage divider comprising resistors 45, 46 and 47. Operational amplifier 44 is of course a differential amplifier and is one embodiment of second threshold means. The output of operational amplifier 44 is connected to a resistor 48. Resistors 45, 46 and 47 are so proportioned that operational amplifier 44 is blocked when the light falling on light-sensitive resistor 7 exceeds an intermediate light intensity and is conductive when the light falling on light-sensitive resistor 7 is less than said intermediate light intensity. The output of operational amplifier 44 is connected to the control input 23' of D flip-flop 24'. Gating input 25' is connected, in common with gating input 25 of flip-flop 24 to that side of resistor 15 which is connected to switch 14. Inverting output of D flip-flop 24' is denoted by reference numeral 26' and is connected to a terminal 49. D flip-flop 24' has the same construction as D flip-flop 24 which is shown in FIG. 2.

Figure 1B:
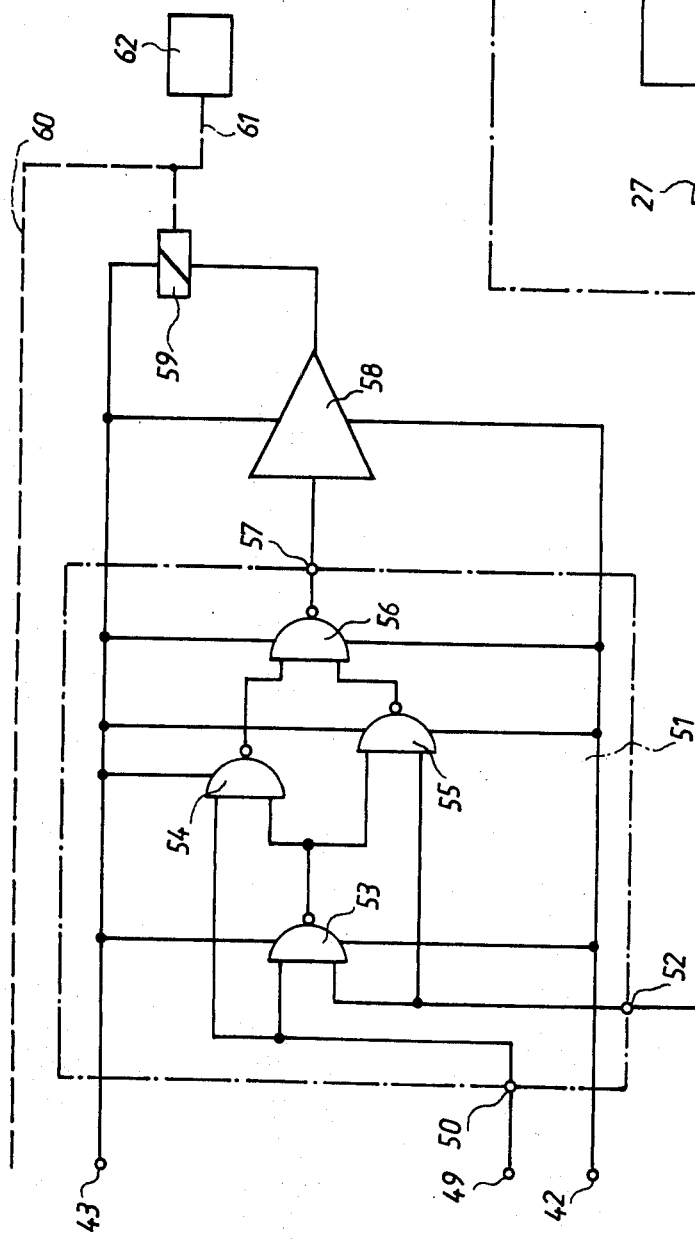

Referring now to FIG. 1b, output 26' of flip-flop 24' is connected through terminal 49 with the first input 50 of an exclusive OR-circuit. The exclusive OR-circuit is one embodiment of logic means. Output 26 of D flip-flop 24 is connected through terminal 41 to the second input 52 of the exclusive OR-circuit 51.

Exclusive OR-circuit 51 includes four NAND-gates 53, 54, 55 and 56. Input 50 is connected to the first input of NAND-gate 53 and the first input of NAND-gate 54. Input 52 is connected to the second inputs of NAND-gates 53 and 55. The outputs of NAND-gates 54 and 55 are connected to the first and second input of a NAND-gate 56 respectively. The output of NAND-gate 56 is connected to terminal 57 which is the output of the exclusive OR-circuit 51.

Let it now be assumed that a "0" signal is applied to inputs 50 and 52 of exclusive OR-circuits 51. Under these conditions the output of NAND-gate 53 is a "1", that of NAND-gate 54 a "1", that of NAND-gate 55 a "1", and therefore that of NAND-gate 56 a "0". Similarly, for a "1" signal applied at both inputs, the output will also be a "0" signal. If, however, a "0" signal is applied at input 50 while a "1" signal is applied at input 52, the output of NAND-gate 53 will remain a "1", but the output of NAND-gate 55 will become "0". Thus a "1" and a "0" signal are applied at the first and second inputs of NAND-gate 56 respectively causing the output to go to "1". Similar considerations would obtain if a "1" signal were applied at input 50 of circuit 51 and a "0" input at input 52. To summarize, the signal at output 57 of exclusive OR-circuit 51 will be "0" whenever the inputs at terminals 50 and 52 are the same and will be a "1" whenever these inputs are different from each other.

Output 57 of exclusive OR-circuit 51 is connected to the input of a threshold circuit 58 and whose output circuit is connected an aperture control electromagnet 59. A mechanical connection 60 connects electromagnet 59 to switch 10 of FIG. 1a, while a mechanical connection 61 connects it to a diaphragm element 62.

The above-described equipment operates as follows:
When switches 2, 3 and 14 are closed, transistors 6, 9 and 17 are fully conductive. Capacitor 8 is thus short-circuited. Transistor 13 is blocked, whereby photoresistor 7 is connected in series with resistor 12 to form a voltage divider. If the light available for an exposure exceeds the intermediate light value, both operational amplifiers 19 and 44 are blocked. Thus a "1" potential is applied to control inputs 23 and 23' of flip-flops 24 and 24' respectively. Since switch 14 is closed a gating signal is applied to gating inputs 25 and 25' of D flip-flops 24 and 24' causing a "0" potential to appear at outputs 26 and 26'. Thus inputs 50 and 52 of exclusive OR-circuit 51 both receive a "0" signal. Output 57 thus also carries a "0" signal. Threshold circuit 58 is blocked and electromagnet 59 deenergized. Through the mechanical connection which is not shown, the F-stop (aperture value) of 5.6 is set in. Switch 10 is open.

Since transistor 32 is blocked, diode 33 is energized and informs the photographer that sufficient light for an exposure is available. Transistor 38 is fully conductive so that light-emitting diode 39 is short-circuited and therefore does not render an indication.

If the light falling on photoresistor 7 is greater than the lower intensity value but smaller or equal to the intermediate intensity value, operational amplifier 44 is conductive while operational amplifier 19 is blocked. Thus control input 23' of flip-flop 24' carries the potential "0", while input 23 of flip-flop 24 receives the "1" signal. Output 26' of D flip-flop 24' thus carries a "1" signal which is applied to input 50 of exclusive OR-circuit 51, while input 52 of this circuit has a "0" signal applied to it. Thus the potential at the output of exclusive OR-circuit 51 carries a "1" signal which causes threshold stage 58 to become conductive causing electromagnet 59 to be energized. Energization of electromagnet 59 causes the aperture 7 to assume the value 2.8. Further, through connection 60 switch 10 is closed causing capacitor 11 to be connected in parallel to capacitor 8. Thus the fact that the aperture value has been changed causes a corresponding change in the integrating circuit of the automatic exposure control apparatus.

If now the light intensity becomes less than even the minimum intensity, operational amplifier 19 becomes conductive (it should be noted that when it is stated that an operational amplifier becomes conductive, what is meant is that the output transistor becomes conductive causing the output to be effectively connected to the negative side of the battery). Input 23 of D flip-flop 24 receives a "0" signal. Output 26 thus carries a "1" signal. Light emitting diode 33 is deenergized while diode 39 is energized. The "1" signal is applied to both inputs of exclusive OR-circuit 51 so that the potential at its output 57 is a "0" potential. Threshold stage 58 is blocked so that electromagnet 59 is deenergized and the aperture is again set to a 5.6 value.

When a picture is to be taken switch 14 is opened causing transistor 13 to become conductive and short-circuiting resistor 12, while transistor 9 is blocked causing capacitor 8 to be connected in series with photoresistor 7. The gating signal has been removed from inputs 25 and 25' of D flip-flops 24 and 24' by opening of switch 14. The potential of inputs 25 and 25' is thus "0". The previously set signals at outputs 26 and 26' will remain unchanged and independent of signals applied at the control inputs, since the gating signal has now been removed from both of these flip-flops. The aperture will thereby remain set at the correct value during the exposure. Only the subsequent closing of switch 14 just prior to a following exposure causes the gating signal to be again applied to the D flip-flops thus again enabling these flip-flops to follow changes in the outputs of threshold stages 19 and 44.

While the invention has been illustrated and described as embodied in using particular logic and threshold circuits, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera having film, a shutter for admitting light to said film during an exposure time, light-sensitive means responsive to the light available for an exposure for furnishing a light-dependent signal varying as a function thereof, and a diaphragm having an aperture positioned in the path of said light for controlling the quantity of light falling on said film during said exposure time, apparatus for controlling the size of said aperture as a function of said light available for said exposure, comprising, in combination, first and second threshold means each having an input connected to said light-sensitive means, for furnishing, respectively, a first and second threshold output signal when said light-dependent signal is indicative of light within a first and second light range respectively; first and second bistable means each having a control input connected to a corresponding one of said threshold means and a gating input, respectively operative in the presence of a gating signal at the corresponding gating input to furnish a first and second bistable output signal in response to said first and second threshold output signal respectively, each operative in the absence of said gating signal to store the last so-furnished bistable output signal; logic means having a first and second input connected to said first and second bistable means respectively, for furnishing a logic output signal only in response to predetermined signals at said first and second inputs; and diaphragm control means having an input connected to said logic means and an output coupled to said diaphragm for setting said aperture to a first predetermined aperture value in response to said logic output signal and to a second predetermined aperture value in the absence of said logic output signal.

2. A photographic camera as set forth in claim 1, wherein said photographic camera further comprises integrator means connected to said light-sensitive means for integrating said light-dependent signal and furnishing a total light signal corresponding to the so-integrated light-dependent signal, said integrator means comprising at least a first and second integrator element; and wherein said automatic aperture control apparatus further comprises switch means coupled to said diaphragm control means for operation therewith, for connecting said second integrator element to and disconnecting said second integrator element from said first integrator element in correspondence to said first and second predetermined aperture values respectively.

3. A photographic camera as set forth in claim 2, wherein said first and second integrator elements are a first and second capacitor respectively.

4. A photographic camera as set forth in claim 1, wherein said first and second threshold means comprise a first and second operational amplifier each having an inverting and a direct input; means for applying a first reference voltage corresponding to a minimum light intensity to said inverting input of said first operational amplifier and a second reference voltage corresponding to an intermediate light intensity to said inverting input of said second operational amplifier, means for directly connecting said direct inputs of said first and second operational amplifier to said light-sensitive means, and means for connecting the output of said first and second operational amplifier respectively to the control input of said first and second bistable means.

5. A photographic camera as set forth in claim 1, further comprising indicator means connected to said first bistable means for indicating sufficient and insufficient light for an exposure in dependence upon the absence and presence of said bistable output signal.

6. A photographic camera as set forth in claim 5, wherein said indicator means comprise a first and second light-emitting diode, and means for energizing said first and second light-emitting diode, respectively, in response to the presence and absence of said bistable output signal.

7. In a photographic camera having film, a shutter for admitting light to said film during an exposure time, light sensitive means responsive to the light available for an exposure for furnishing a light dependent signal varying as a function thereof, integrator means connected to said light sensitive means for integrating said light dependent signal and furnishing a total light signal corresponding to the so integrated light-dependent signal, said integrator means comprising at least a first and second integator element, and a diaphragm having an aperture positioned in the path of said light for controlling the quantity of light falling on said film during said exposure time, apparatus for controlling the size of said aperture as a function of said light available for said exposure, comprising, in combination, first and second threshold means each having an input connected to said light sensitive means, for furnishing, respectively, a first and second threshold output signal when said light dependent signal is indicative of light within a first and second light range respectively; first and second bistable means each having a control input connected to a corresponding one of said threshold means and a gating input, and respectively operative in the presence of a gating signal at the corresponding gating input for furnishing a first and second bistable output signal in dependence upon the absence or presence of said first and second threshold output signal respectively, each operative in the absence of a gating signal to store the last so furnished bistable output signal; logic means having a first and second input connected to said first and second bistable means respectively for furnishing a logic output signal only in response to predetermined signals at said first and second inputs; diaphragm control means having an input connected to said logic means and an output coupled to said diaphragm for setting said aperture to a first predetermined aperture value in response to said logic output signal and to a second predetermined aperture value in the absence of said logic output signal; switch means coupled to said diaphragm control means for operation therewith, for connecting said second integator element to and disconnecting said second integrator element from said first integrator element in correspondence to said first and second predetermined aperture values respectively; and means for applying said gating signal to said gating input of said first and second bistable means prior to the exposure time and for disconnecting said gating signal from said gating input at the start of said exposure time.

8. A photographic camera as set forth in claim 7, wherein said means for applying said gating signal comprises a source of electrical energy and externally operable switch means for connecting said source of electrical energy to said gating inputs when closed.

9. A photographic camera as set forth in claim 8, further comprising a resistor, means for connecting said resistor to said source of electrical energy, and function control means connected to said externally operable switch means, said integrator means and said resistor, for connecting said resistor or said integrator means to said light-sensitive means in dependence upon the state of said externally operable switch means.

10. A photographic camera as set forth in claim 9, wherein said function control means comprise a first transistor connected in parallel with said integrator means and a second transistor connected in parallel with said resistor, for, respectively, connecting said resistor or said integrator means to said light-sensitive means when in a conductive state, and means for switching said first and second transistor to said conductive state when said externally operable switch means is closed and opened respectively.

11. A photograhic camera as set forth in claim 10, wherein said means for switching said first and second transistors to said conductive state comprise a voltage divider having a first terminal connected to one side of said source of electrical energy, a second terminal connected to said externally operable switch means and a voltage divider tap connected to the base of said first transistor, and an inverter circuit connected between said voltage divider tap and the base of said second transistor.

12. In a photographic camera having film, a shutter for admitting light to said film during an exposure time, light-sensitive means responsive to the light available for an exposure for furnishing a light-dependent signal varying as a function thereof, and a diaphragm having an aperture positioned in the path of said light for controlling the quantity of light falling on said film during said exposure time, apparatus for controlling the size of said aperature as a function of said light available for said exposure, comprising, in combination, first and second threshold means each having an input connected to said light-sensitive means, for furnishing, respectively, a first and second threshold output signal when said light-dependent signal is indicative of light within a first and second light range respectively; first and second bistable circuit means each having a control input connected to a corresponding one of said threshold means and a gating input, respectively operative in the presence of a gating signal at the corresponding gating input to furnish a first and second bistable output signal in response to said first and second threshold output signal respectively, each operative in the absence of said gating signal to store the last so furnished bistable output signal; logic means having a first and second input connected to said first and second bistable means respectively, for furnishing a logic output signal only in response to predetermined signals at said first and second inputs; diaphragm control means having an input connected to said logic means and an output coupled to said diaphragm for setting said aperture to a first predetermined aperture value in response to said logic output signal and to a second predetermined aperture value in the absence of said logic output signal; and means for applying said gating signal to said gating input of said first and second bistable means prior to the exposure time and for disconnecting said gating signal from said gating input at the start of said exposure time, whereby the aperture value set prior to the exposure time remains set during the exposure time, independent of the light falling on said light sensitive means.

13. A photographic camera as set forth in claim 12, wherein said means for applying said gating signal comprises source of electrical energy and externally operable switch means for connecting said source of electrical energy to said gating inputs when closed.

14. In a photographic camera having film, a shutter for admitting light to said film during an exposure time only, light-sensitive means responsive to the light available for an exposure for furnishing a light-dependent signal varying as a function thereof, and a diaphragm having an aperture positioned in the path of said light for controlling the quantity of light falling on said film during said exposure time, apparatus for controlling the size of said aperture as a function of said available for said exposure, comprising, in combination, threshold means having an input connected to said light sensitive means for furnishing a threshold output signal only when said light-dependent signal is indicative of light outside of a first light range; bistable circuit means having a control input connected to said threshold means and a gating input, and operative in the presence of a gating signal at said gating input to furnish a first or second bistable output signal in dependence upon the absence or presence, respectively, of said threshold output signal, and operative in the absence of said gating signal to store the last so-furnished bistable output signal; diaphragm control means having an input connected to said bistable circuit means and an output coupled to said diaphragm for setting said aperture to a first predetermined aperture value in response to said bistable output signal and to a second predetermined aperture value in the absence of said bistable output signal; and means for furnishing said gating signal to said gating input of said bistable circuit means prior to the exposure time and for disconnecting said gating signal from said gating input at the start of said exposure time.

* * * * *